United States Patent [19]

Takebe et al.

[11] Patent Number: 5,187,986
[45] Date of Patent: Feb. 23, 1993

[54] SEMICONDUCTOR SENSOR

[75] Inventors: Katsuhiko Takebe; Satoshi Hiyama, both of Tokyo, Japan

[73] Assignee: Honda Giken Kogyo Kabushiki Kaisha, Tokyo, Japan

[21] Appl. No.: 651,131

[22] Filed: Feb. 6, 1991

[30] Foreign Application Priority Data

Feb. 6, 1990 [JP] Japan .................................. 2-26420

[51] Int. Cl.$^5$ .............................................. G01B 7/16
[52] U.S. Cl. ....................................... 73/766; 257/254
[58] Field of Search ..................... 73/766, 777, 862.63, 73/765; 374/172, 178; 357/25

[56] References Cited

U.S. PATENT DOCUMENTS

| | | | |
|---|---|---|---|
| 3,245,252 | 4/1966 | First et al. | 73/766 |
| 3,582,690 | 6/1971 | Yerman | 73/766 X |
| 3,714,806 | 2/1973 | Berkey et al. | 73/765 X |
| 3,737,684 | 6/1973 | Kuno et al. | 73/765 X |
| 4,633,099 | 12/1986 | Tanabe et al. | 73/777 X |

FOREIGN PATENT DOCUMENTS 62-213280 9/1987 Japan .

Primary Examiner—Jerry W. Myracle
Attorney, Agent, or Firm—Irving M. Weiner; Joseph P. Carrier; Pamela S. Burt

[57] ABSTRACT

A semiconductor sensor includes a field-effect transistor for detecting a physical quantity such as pressure, strain, acceleration or the like. The field-effect transistor is disposed on an elastically deformable portion of a cantilevered semiconductor substrate. A detected signal generator generates a signal representing a change in a drain current of the field-effect transistor in response to a stress which is applied to the field-effect transistor due to elastic deformation of the semiconductor substrate. The field-effect transistor may be supplied with a fixed gate bias voltage and an integrator may generate a signal representing an integral of the drain current for temperature compensation. Alternatively, an integrator may generate a signal representing an integral of the drain current, and a gate bias voltage may be applied to the field-effect transistor so that the signal generated by the integrator will be of a predetermined value for automatic temperature compensation. As a further alternative, a self-bias circuit may be connected between the field-effect transistor and the detected signal generator for applying a gate self-bias voltage to the field-effect transistor for automatic temperature compensation.

13 Claims, 3 Drawing Sheets

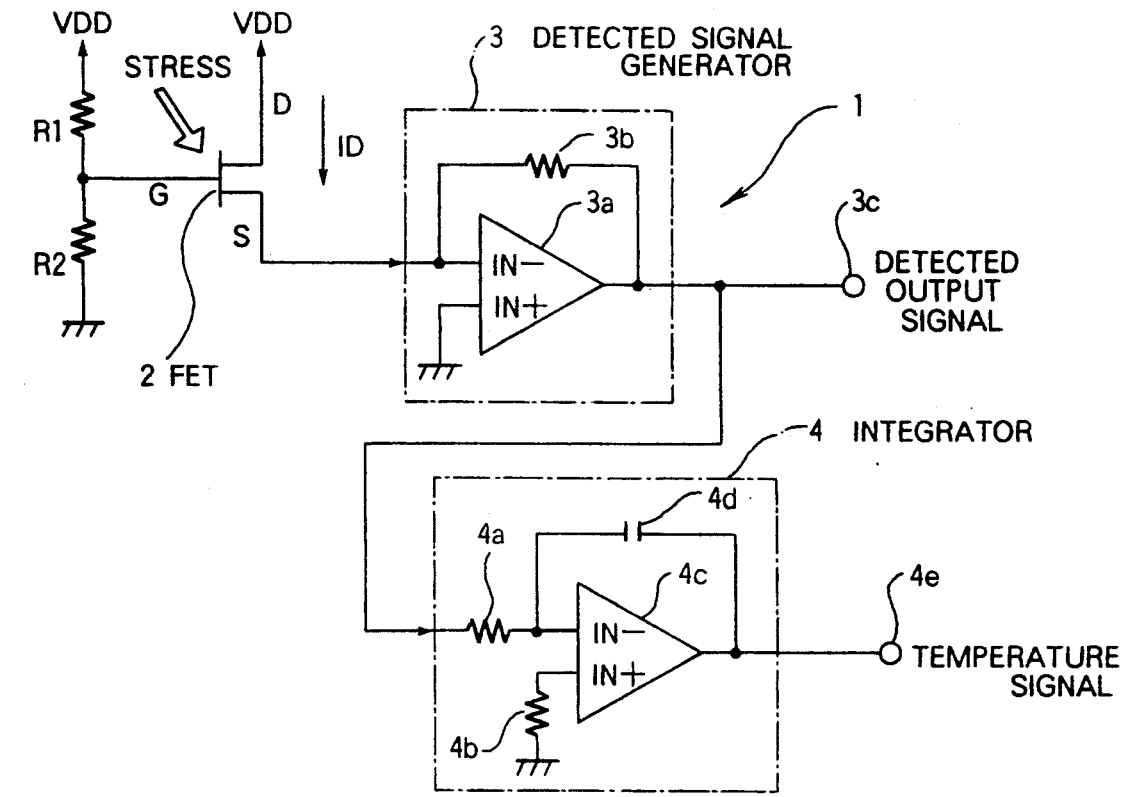
F I G . 1
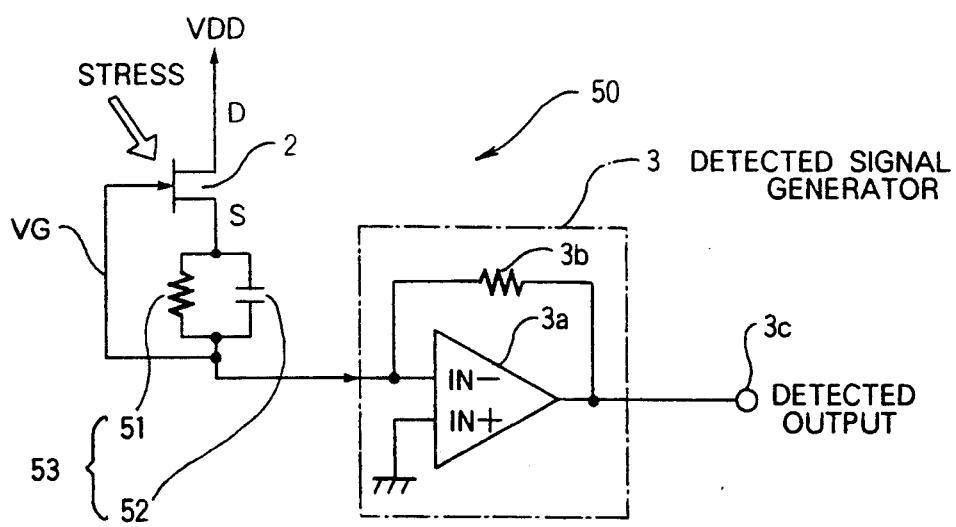
F I G . 5

SEMICONDUCTOR SENSOR

BACKGROUND OF THE INVENTION

1. Field of the Invention:

The present invention relates to a sensor comprising a field-effect transistor (FET) as a pressure-sensitive element for detecting a physical quantity such as pressure, acceleration, etc., and more particularly to a semiconductor sensor capable of producing a detected output signal which has been temperature-compensated.

2. Relevant Art:

There is known one type of semiconductor sensor which comprises a pressure-sensitive element in the form of an FET whose drain current varies when it is put under pressure, strain, or the like. The semiconductor sensor is associated with a temperature compensating circuit which compensates for a temperature-dependent change in the drain current. The temperature compensating circuit may comprise a temperature-detecting FET, and output signals from the pressure-detecting FET and the temperature-detecting FET may be compared with each other for temperature compensation. Such an arrangement however results in an increased semiconductor chip area of the semiconductor sensor.

Japanese Laid-Open Patent Publication No. 58(1983)-015029 and Japanese Patent Publication No. 1(1989)-59525 disclose a scheme for temperature compensation without use of a temperature-detecting FET. In the disclosed arrangement, the gate bias voltage of the pressure-detecting FET is set to a value which makes the temperature dependency on the VGS-IDS characteristic curve substantially null.

The sensitivity of an FET for detecting a physical quantity applied thereto, i.e., a change in the drain current which is caused by a change in the physical quantity applied thereto, depends on the value of the drain current. If the gate bias current of the FET is set to a value that makes the temperature dependency substantially null, then a desired degree of detecting sensitivity may not be achieved. Different FET characteristics require different gate bias voltages and different drain currents, necessitating adjustments of the circuit for applying the gate bias voltage and the circuit for amplifying output signals.

SUMMARY OF THE INVENTION

It is an object of the present invention to provide a semiconductor sensor which is capable of producing a temperature output signal for temperature compensation without employing a temperature-detecting FET and also without imposing limitations on bias conditions for an FET for detecting a physical quantity such as a pressure, a strain, or the like.

Another object of the present invention is to provide a semiconductor sensor for producing a temperature-compensated output signal.

According to the present invention, there is provided a semiconductor sensor for detecting a physical quantity applied thereto, comprising a semiconductor substrate having a portion which is elastically deformable under a physical quantity imposed thereon, a field-effect transistor disposed on the elastically deformable portion of the semiconductor substrate, biasing means for applying a constant gate bias voltage to the field-effect transistor, a detected signal generator for generating a signal representing a change in a drain current of the field-effect transistor in response to a stress which is applied to the field-effect transistor due to elastic deformation of the semiconductor substrate, and an integrator for generating a signal representing an integral of the drain current.

When the field-effect transistor is subjected to the stress, the drain current thereof varies, and the detected signal generator produces a signal indicative of the applied stress. The signal produced by the integrator serves as a temperature signal representative of a temperature change, exclusive of short-time changes in the drain signal.

According to the present invention, there is also provided a semiconductor sensor for detecting a physical quantity applied thereto, comprising a semiconductor substrate having a portion which is elastically deformable under a physical quantity imposed thereon, a field-effect transistor disposed on the elastically deformable portion of the semiconductor substrate, a detected signal generator for generating a signal representing a change in a drain current of the field-effect transistor in response to a stress which is applied to the field-effect transistor due to elastic deformation of the semiconductor substrate, an integrator for generating a signal representing an integral of the drain current, and biasing means for applying a gate bias voltage to the field-effect transistor so that the signal generated by the integrator will be of a predetermined value.

When the drain current of the FET varies due to a temperature change, the signal from the integrator also varies. Then, the biasing means regulates the gate bias voltage applied to the field-effect transistor in a manner to eliminate the temperature-dependent change in the drain current. Therefore, the signal from the detected signal generator is temperature-compensated.

According to the present invention, there is further provided a semiconductor sensor for detecting a physical quantity applied thereto, comprising a semiconductor substrate having a portion which is elastically deformable under a physical quantity imposed thereon, a field-effect transistor disposed on the elastically deformable portion of the semiconductor substrate, biasing means for applying a gate self-bias voltage to the field-effect transistor, and a detected signal generator for generating a signal representing a change in a drain current of the field-effect transistor in response to a stress which is applied to the field-effect transistor due to elastic deformation of the semiconductor substrate.

When the drain current of the FET varies due to a temperature change, the gate bias voltage is automatically controlled to bring the drain current back to a predetermined level. The signal from the detected signal generator is therefore temperature-compensated.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a circuit diagram, partly in block form, of a semiconductor sensor according to a first embodiment of the present invention;

FIG. 5 is a circuit diagram, partly in block form, of a semiconductor sensor according to a third embodiment of the present invention.

DETAILED DESCRIPTION OF THE PREFERRED EMBODIMENTS

Figure 2:
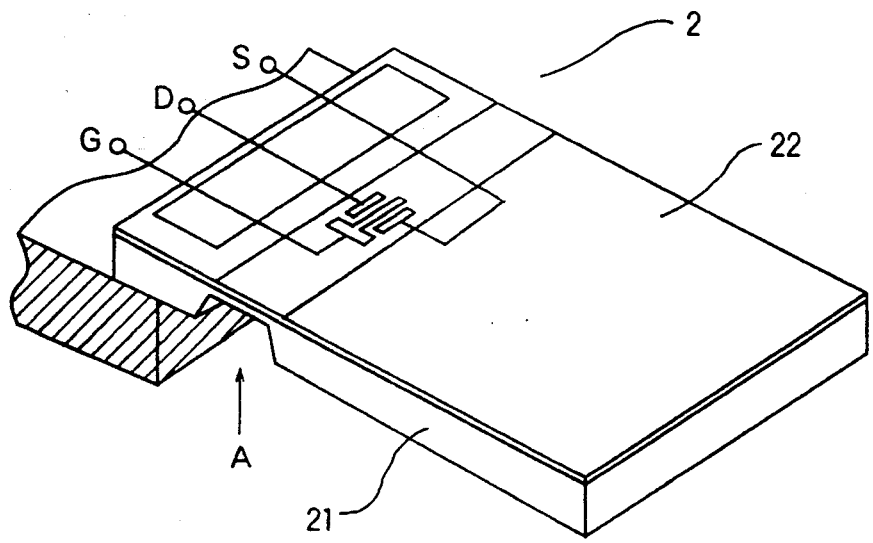
FIG. 2 is a perspective view of the structure of a field-effect transistor in the semiconductor sensor shown in FIG. 1.

Like or corresponding parts are denoted by like or corresponding reference characters throughout views.

FIG. 1 shows a semiconductor sensor according to a first embodiment of the present invention.

As shown in FIG. 1, the semiconductor sensor, generally denoted at 1, includes a field-effect transistor (FET) 2 for detecting a stress, a detected signal generator 3 for producing a voltage corresponding to a drain current ID supplied from the FET 2 to the detected signal generator 3, and an integrator 4 for integrating the voltage generated by the detected signal generator 3 to produce a temperature signal.

The FET 2 has a drain D connected to a power supply VDD and a gate G connected to a junction between resistors R1, R2 of a voltage divider. The voltage applied from the power supply VDD is divided by the resistors R1, R2, producing a gate bias voltage which is applied to the gate G of the FET 2.

The detected signal generator 3 comprises a current-to-voltage (I-V) converter which includes an operational amplifier 3a and a resistor 3b connected parallel to the operational amplifier 3a. The source S of the FET 2 is connected to an inverting input terminal IN− of the operational amplifier 3a. The operational amplifier 3a has a noninverting input terminal IN+ connected to ground. Based on the potential difference being substantially zero between the input terminals IN−, IN+ of the operational amplifier 3a, the FET 2 is driven at a constant voltage.

The integrator 4 comprises an operational amplifier 4c and a capacitor 4d connected parallel thereto, providing a feedback loop. The operational amplifier 4c has inverting and noninverting input terminals IN−, IN+ to which respective input resistors 4a, 4b are connected. The input resistor 4a is connected to the output terminal of the operational amplifier 3a of the detected signal generator 3. The input resistor 4b is grounded. The integrator 4 has an integral time constant which is of a value sufficiently longer than the time in which a physical quantity such as pressure, strain, or the like to be detected by the FET 2 is applied or varies.

The integrator 4 may be in the form of a series-connected circuit of a resistor and a capacitor, so that a voltage across the charged capacitor is available as a temperature signal. The detected signal generator 3 may be in the form of a current amplifier with a resistor connected to its output terminal.

FIG. 2 shows in perspective the structure of the FET 2.

The FET 2 shown in FIG. 2 is of a cantilever configuration suitable for detecting pressure, strain, acceleration, or the like. A semiconductor substrate 21 of silicon (Si) is fixed at one end to a support. A crystal layer 22 of gallium arsenide (GaAs) is deposited on the semiconductor substrate 21 by way of epitaxial growth. The lower surface of the semiconductor substrate 21 is partly etched away providing a thinned portion A, and the FET 2 is formed on the crystal layer 22 above the thinned portion A of the semiconductor substrate 21. The FET 2 may comprise a junction FET (J-FET), a MES-FET, or a MIS-FET. With the semiconductor 21 fixed at one end to the support, when a pressure, a strain, or an acceleration is applied transversely to the other end of the semiconductor substrate 21, the crystal layer 22 is bent in its region over the thinned portion A. When the crystal layer 22 is thus bent, a stress is applied to the FET 2 to vary the mutual conductance gm thereof.

Figure 3:
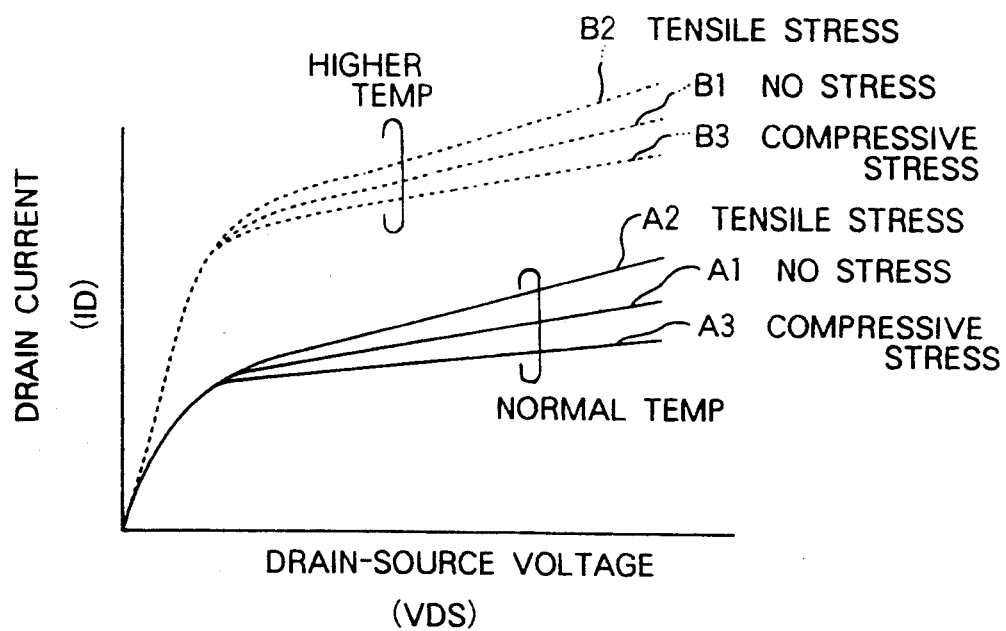
FIG. 3 is a graph showing the voltage vs current characteristics of the field-effect transistor.

FIG. 3 shows the relationship between the drain current ID and the drain-source voltage VDS of the FET 2. The graph of FIG. 3 has a horizontal axis representing the drain-source voltage VDS and a vertical axis representing the drain current ID. Solid-line characteristic curves A1, A2, A3 are plotted when the FET 2 is at normal temperature of 25° C. The characteristic curve A1 is plotted when no stress is applied to the FET 2. When the FET 2 is under a tensile stress, the drain current ID increases according to the curve A2 as the drain-source voltage VDS increases. When the FET 2 is under a compressive stress, the drain current ID decreases according to the curve A3 as the drain-source voltage VDS decreases. When the FET 2 is at a higher temperature of 50° C., the drain current ID varies according to a dotted-line curve B1 when no stress is applied, a dotted-line curve B2 when the FET 2 is under a tensile stress, and a dotted-line curve B3 when the FET 2 is under a compressive stress.

Therefore, when a pressure, a strain, or an acceleration is imposed on the FET 2, the drain current ID varies to an extent commensurate with the direction and magnitude of the applied physical quantity. The change in the drain current ID is converted into a corresponding voltage by the detected signal generator 3. Thus, a voltage output signal corresponding to the detected stress is available from a detected signal output terminal 3c connected to the output terminal of the operational amplifier 3a.

The integral time constant of the integrator 4 is sufficiently long as described above. Therefore, the integrator 4 does not produce output signals corresponding to changes in a short period of time, but produces an output signal corresponding to a slow change in the drain current ID due to a change in the ambient temperature. Consequently, an output voltage corresponding to the temperature is available from a temperature output signal terminal 4e connected to the output terminal of the operational amplifier 4c.

Since the semiconductor sensor 1 can produce both a detected signal indicative of an applied stress and a temperature signal indicative of an ambient temperature, a control system to which the semiconductor sensor 1 is connected can compensate for a temperature-dependent error of the detected physical quantity.

With the semiconductor sensor 1 shown in FIG. 1, the temperature signal is generated by integrating the output current from the FET 2. Therefore, the semiconductor sensor 1 does not require any dedicated temperature-detecting circuit or FET for temperature compensation of the detected output signal. Since the single FET 2 is used to detect the applied stress and the temperature, the detected output signal can accurately be temperature-compensated. The semiconductor sensor 1 can also be employed as a temperature sensor.

Figure 4:
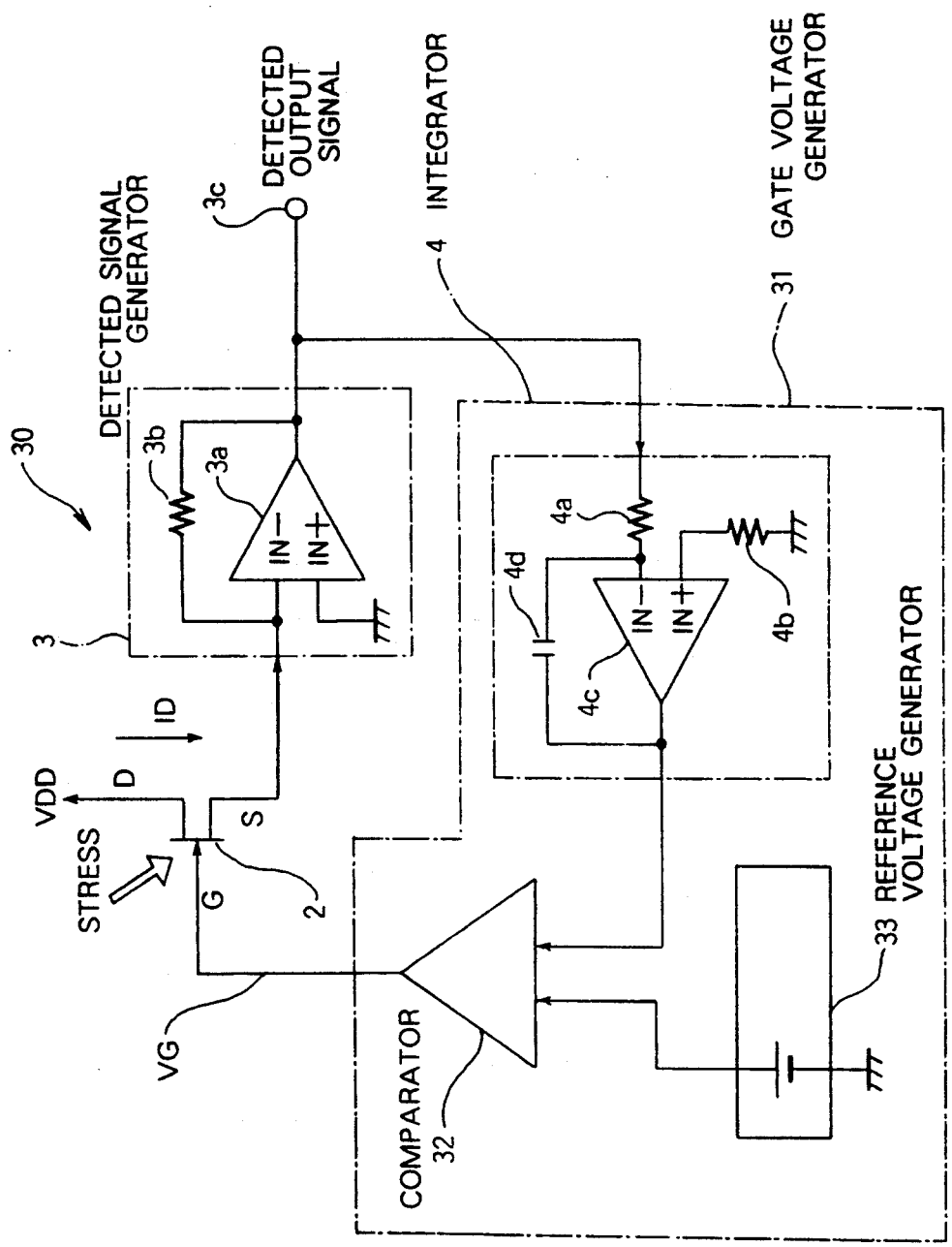
FIG. 4 is a circuit diagram, partly in block form, of a semiconductor sensor according to a second embodiment of the present invention.

FIG. 4 shows a semiconductor sensor according to a second embodiment of the present invention.

The semiconductor sensor, generally denoted at 30 in FIG. 4, is arranged to control the gate bias voltage VG of the FET 2 so that the drain current ID thereof will be of a predetermined value.

The gate bias voltage VG applied to the FET 2 is supplied from a gate voltage generator 31 which comprises a comparator 32, a reference voltage generator 33, and the integrator 4. The comparator 32 has an output terminal connected to the gate G of the FET 2, an input terminal connected to the output terminal of the operational amplifier 4c of the integrator 4, and another input terminal connected to the reference voltage generator 33. The comparator 32 compares a reference voltage VR generated by the reference voltage generator 33 and an output voltage from the integrator 4, and controls the gate bias voltage VG in order to eliminate any difference between the compared voltages.

If the drain current ID of the FET 2 is increased, for example, at a higher temperature to the extent that the output voltage from the integrator 4 becomes higher than the reference voltage VR from the reference voltage generator 33, then the comparator 32 increases the gate bias voltage VG depending on the difference between the compared voltages. The drain current ID is therefore reduced or brought back to a predetermined level. Since the drain current ID of the FET 2 is kept at the predetermined level even when the ambient temperature varies, the detected signal output terminal 3c produces a temperature-compensated output signal.

FIG. 5 shows a semiconductor sensor according to a third embodiment of the present invention.

As shown in FIG. 5, the semiconductor sensor, generally denoted at 50, includes a self-bias or automatic-bias circuit 53 connected between the FET 2 and the detected signal generator 3, for applying a self-bias voltage to the gate of the FET 2. The self-bias circuit 53 comprises a resistor 51 and a capacitor 52 which are connected parallel to each other. A change in the drain current ID which is caused by a change in the applied stress during a short time or cyclic period is transmitted through the capacitor 52 to the detected signal generator 3. On the other hand, when the drain current ID slowly varies due to a change in the ambient temperature, the self-bias circuit 53 determines the gate bias voltage VG depending on the temperature-dependent change in the drain current ID.

If the drain current ID of the FET 2 is increased, for example, at a higher temperature, then the voltage drop across the self-bias circuit 53 increases, and hence the gate bias voltage applied to the FET 2 also increases, reducing the drain current ID of the FET 2. Therefore, the drain current ID of the FET 2 is kept at a predetermined level. Consequently, the detected signal output terminal 3c produces a temperature-compensated output signal.

In the semiconductor sensors 30, 50 shown in FIGS. 4 and 5, the gate bias voltage of the FET 2 is regulated under feedback control in order to keep the drain current at a predetermined level, based on a change in the output current of the FET 2 which is caused by a change in the ambient temperature.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A semiconductor sensor for detecting a physical quantity applied thereto, comprising:
    a semiconductor substrate having a portion which is exposed to a physical quantity imposed on the substrate;
    a sole field-effect transistor, said transistor being disposed on said exposed portion of said semiconductor substrate;
    biasing means for applying a gate bias voltage to said field-effect transistor;
    a detected signal generator for generating a signal representing a change in a drain output of said field-effect transistor in response to a stress which is applied to said field-effect transistor due to imposition of the physical quantity on said semiconductor substrate; and
    an integrator for generating a signal representing an integral of said drain output.

2. A semiconductor sensor according to claim 1, wherein said biasing means is adapted to apply said gate bias voltage to said field-effect transistor such that the signal generated by said integrator will be of a predetermined value.

3. A semiconductor sensor according to claim 2, wherein said biasing means comprises a reference voltage generator for generating a reference voltage, and a comparator for comparing said reference voltage and said signal from said integrator and for controlling said gate bias voltage so that any difference between said reference voltage and said signal from said integrator will be eliminated.

4. A semiconductor sensor according to claim 1, wherein said biasing means applies a constant gate bias voltage to said field-effect transistor.

5. A semiconductor sensor according to claim 1, wherein said exposed portion of said semiconductor substrate is elastically deformable under the physical quantity imposed on the substrate.

6. A semiconductor sensor according to claim 1, wherein said drain output of said field-effect transistor is a drain current.

7. A semiconductor sensor according to claim 6, wherein said signal generated by the detected signal generator is a voltage signal.

8. A semiconductor sensor according to claim 7, wherein said detected signal generator comprises an operational amplifier and a resistor connected parallel thereto.

9. A semiconductor sensor according to claim 1, wherein said integrator comprises an operational amplifier and a capacitor connected parallel thereto.

10. A semiconductor sensor according to claim 1, wherein said integrator receives said signal generated by said detected signal generator as the only input thereto.

11. A semiconductor sensor according to claim 10, wherein said integrator directly receives said signal generated by said detected signal generator.

12. A semiconductor sensor according to claim 1, wherein said integrator continuously generates said signal representing an integral of said drain output.

13. A semiconductor sensor according to claim 1, wherein said detected signal generator comprises an operational amplifier.

* * * * *